E. CUNNINGHAM.
LANTERN AND LUNCH RECEPTACLE.
APPLICATION FILED NOV. 11, 1909.
959,118.
Patented May 24, 1910.
2 SHEETS—SHEET 2.
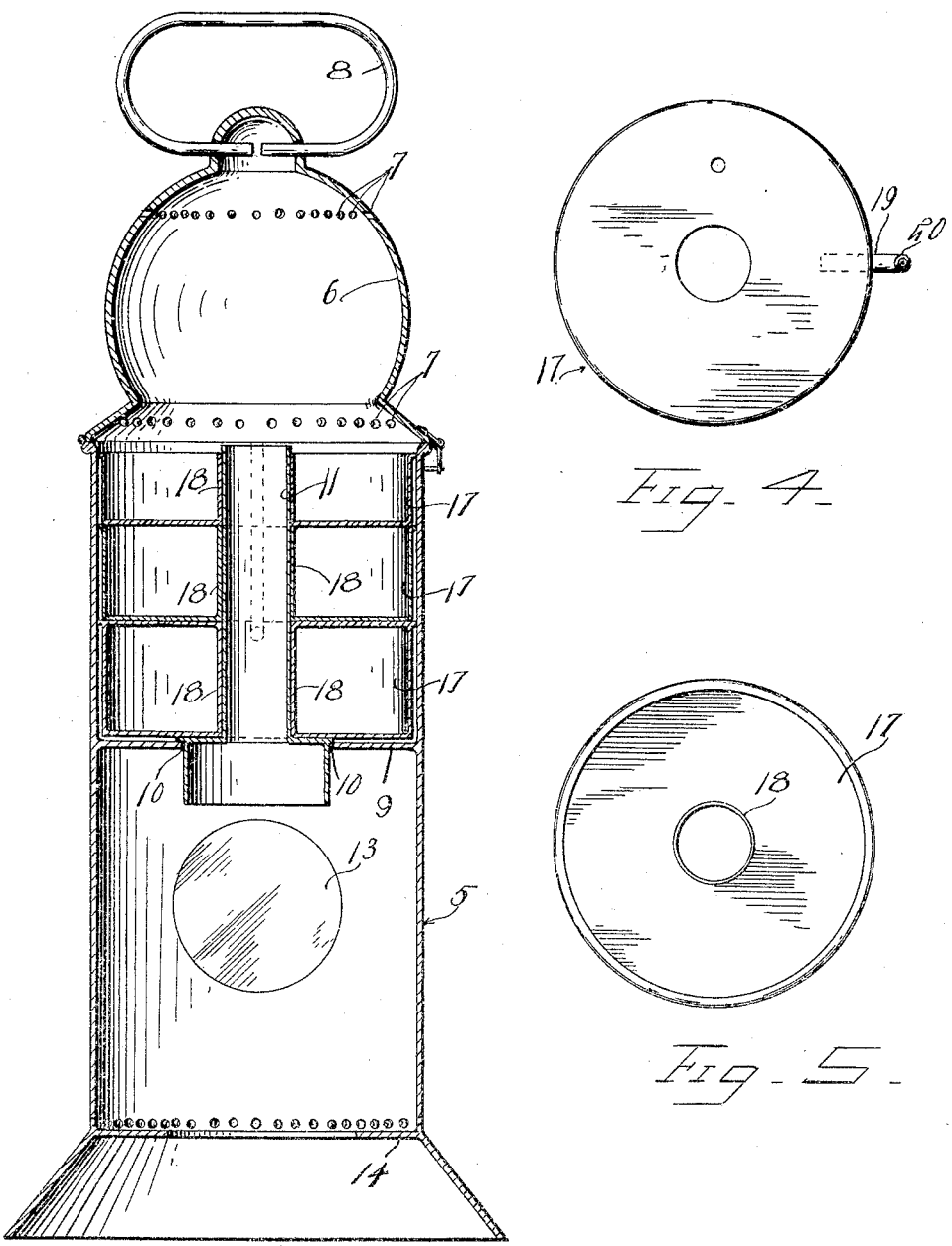

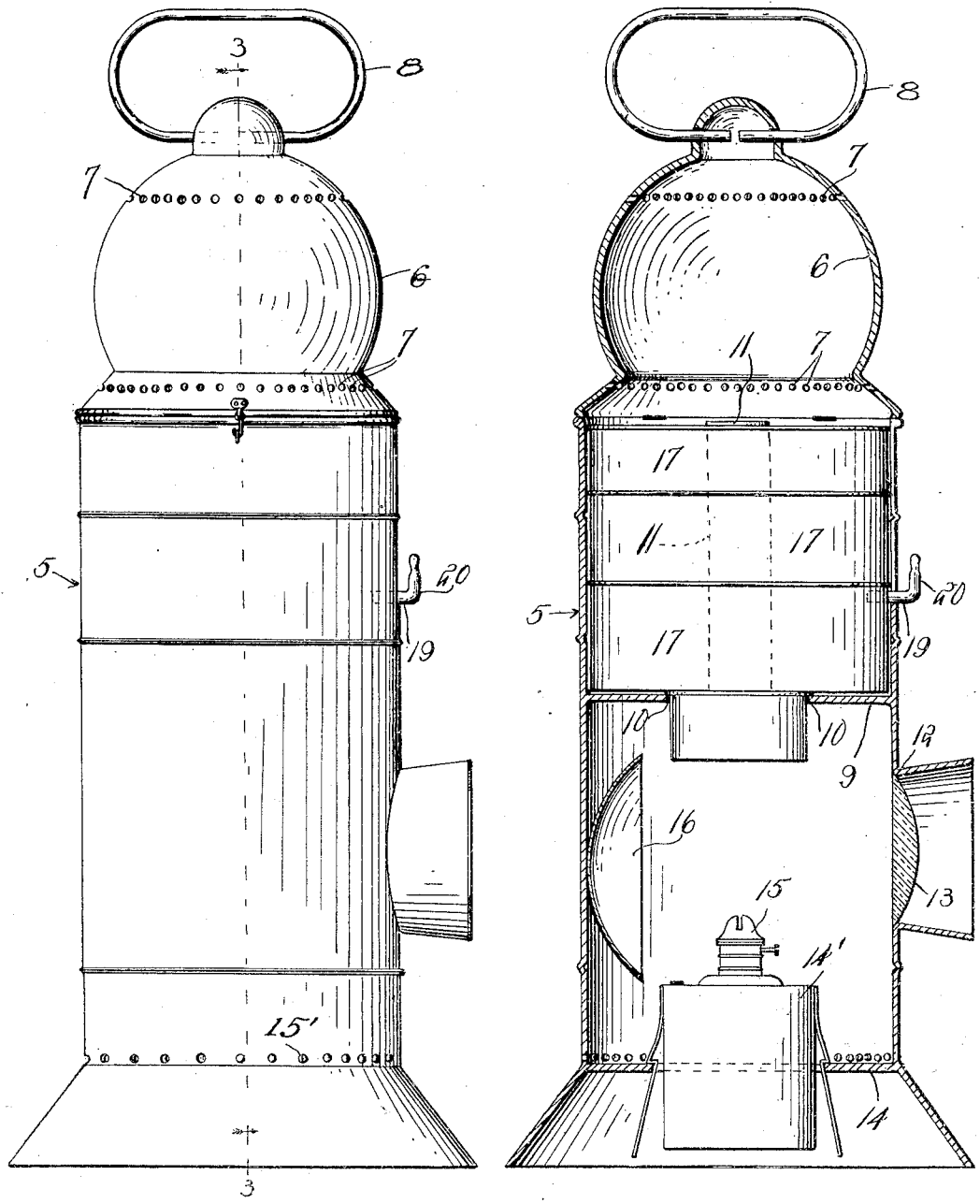

UNITED STATES PATENT OFFICE.

EDWARD CUNNINGHAM, OF LEBANON JUNCTION, KENTUCKY.

LANTERN AND LUNCH-RECEPTACLE.

959,118.  Specification of Letters Patent.  Patented May 24, 1910.

Application filed November 11, 1909. Serial No. 527,533.

*To all whom it may concern:*

Be it known that I, EDWARD CUNNINGHAM, a citizen of the United States, residing at Lebanon Junction, in the county of Bullitt, State of Kentucky, have invented certain new and useful Improvements in Lanterns and Lunch-Receptacles; and I do hereby declare the following to be a full, clear, and exact description of the invention, such as will enable others skilled in the art to which it appertains to make and use the same.

This invention relates to improvements in combined lunch receptacles and lanterns, and has for its object the provision of a device of that kind which will be extremely simple in construction and comparatively inexpensive to manufacture.

Another object is the provision of a liquid receptacle having a steam outlet so that when the beverage in the receptacle boils from the lamp flame an outlet for the steam will eliminate the danger of explosion.

With the above and other objects in view, as will more fully hereinafter appear, the present invention consists in certain novel details of construction and arrangement of parts, hereinafter fully described, illustrated in the accompanying drawings and more particularly pointed out in the appended claims, it being understood that various changes in the form, proportion, size, and minor details of the device, may be made without departing from the spirit of the invention or sacrificing any of its advantages.

In the accompanying drawings forming part of the specification:—Figure 1 is a side elevation of the device. Fig. 2 is a vertical section taken through the casing and showing the food receptacles in side elevation. Fig. 3 is a vertical sectional view of the device with the lamp removed. Fig. 4 is a plan view of the coffee receptacle. Fig. 5 is a similar view of one of the meat receptacles.

Similar numerals of reference are employed to designate corresponding parts throughout.

As shown in the drawings the device consists of a hollow cylindrical casing designated in general by the numeral 5. This member is preferably of sheet-metal and at what will subsequently be termed its upper end is provided with a hinged top 6, having a plurality of openings 7, for escape of gases from the burner, the said top being further provided with a pivoted bail or handle 8, by means of which the device is carried. Intermediate the ends of the casing 5 a metallic disk or plate 9 is arranged. This member is of a size to nicely fit within the casing and is fixedly secured to the inner wall thereof. The disk 9 is centrally provided with a circular opening 10 and inserted through the opening 10 is a tube 11, the upper end of which is uniformly reduced as shown at 11' and terminates in a plane with the upper edge of the casing 5, or substantially so. Formed in that portion of the casing below the disk 9 is an opening 12, and securely fitted in this opening is a bull's-eye lens 13.

The bottom of the device is designated in general by the numeral 14 and has a central opening for the reception of a lamp 14'. This member may be screwed into the lower end of the casing or be detachably connected thereto in any preferred manner. The top of the oil receptacle 14' is provided with a nipple which receives a burner 15, the upper end of which is in a plane with the bull's-eye lens 13. Inlet openings 15' are formed in the casing adjacent its bottom to admit air to the burner.

A reflector 16 is secured to the casing 5 and to one side of the burner and serves to concentrate the rays of light from the burner on the bull's-eye 13. It might here be stated that the burner, when the bottom 14, is in position will be located directly beneath the tube 11.

Arranged within the casing 5 are a plurality of food receptacles designated in general by the numeral 17. These receptacles are preferably of metal and of a size to nicely fit within the casing. The receptacles are open at their upper ends except the lower which is designed to hold tea, coffee, or other beverage and is closed as shown at 17', in order that the bottom of the next succeeding receptacle will have a bearing surface. An inlet opening 18 formed in the top wall 17' of the liquid receptacle permits of the receptacle being filled. In the drawings three of these receptacles are shown and the intermediate receptacle is provided with an offset at the upper end of its side wall for the reception of the uppermost receptacle.

By referring now to the drawings it will be seen that the bottoms of all the receptacles are centrally provided with circular openings and surrounding these openings are tubes 18', of a diameter to receive the tube 11 rising from the disk 9 and of a length corresponding to the height of the receptacle, or approximately so.

Extending laterally from the side wall of the lowermost or liquid holding receptacle and located adjacent the upper end thereof is an outlet pipe 19, the inner end of which communicates with the interior of the liquid receptacle and the outer end of which is bent upwardly as shown at 20. In order that this outlet pipe 19, may extend through the casing 5, a longitudinal slot or opening 21 is formed in the said casing extending from the upper edge to a point adjacent the lower end. With this provision the lowermost receptacle will be permitted to slide into position and bear on the horizontal flange 9 of the casing.

From the foregoing construction it is evident when food is placed in the various receptacles and the wick of the burner lighted that the device may be used as a lantern and at the same time it will be observed that the heat of the flame rising through the tube 11 will heat the contents of the food receptacles. Should the heat produced by the flame be sufficient to boil the contents of the lowermost receptacle, the steam will rise and escape through the outlet tube 19.

What is claimed as new, is:—

1. In a combined lantern and lunch receptacle, a casing interiorly provided with a transverse disk having a central opening and further provided with a slot extending longitudinally of the casing, a tube insertible through the opening in the disk, and a receptacle arranged within the casing having a central opening for the said tube and an outlet pipe extending laterally from the receptacle and through the slot in the casing.

2. In a combined lantern and lunch receptacle, a casing interiorly provided intermediate its ends with a disk having a central opening and further provided with a longitudinal slot extending from its upper edge to a point adjacent said disk, a tube insertible through the opening in the disk, a receptacle arranged within the casing having a central opening for the said tube, an outlet pipe in communication with the interior of the receptacle and its opposite end extending through the slot of the casing and terminating in an upwardly extending portion parallel with the casing.

In testimony whereof, I affix my signature, in presence of two witnesses.

EDWARD CUNNINGHAM.

Witnesses:
W. M. HEIZER,
R. M. HOCKER.